ced Dec. 11, 1962

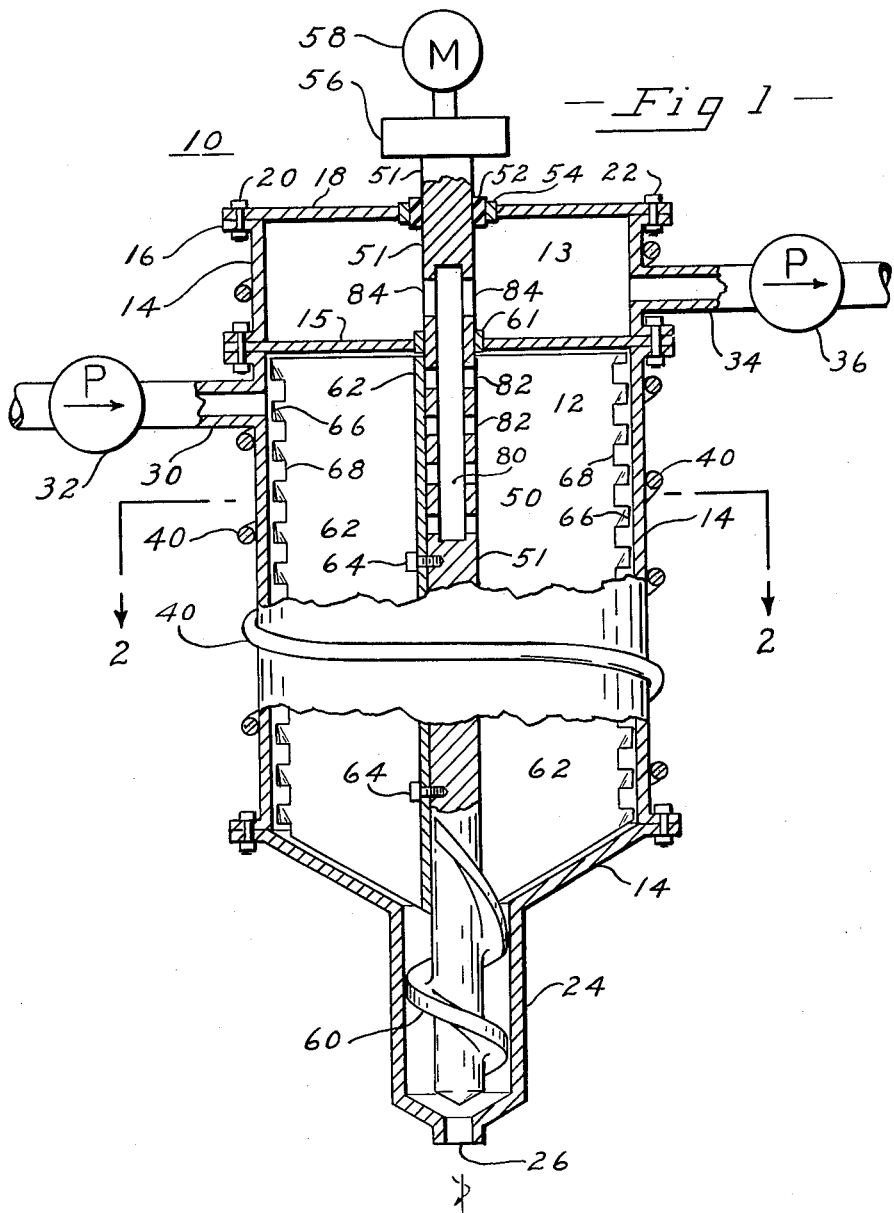

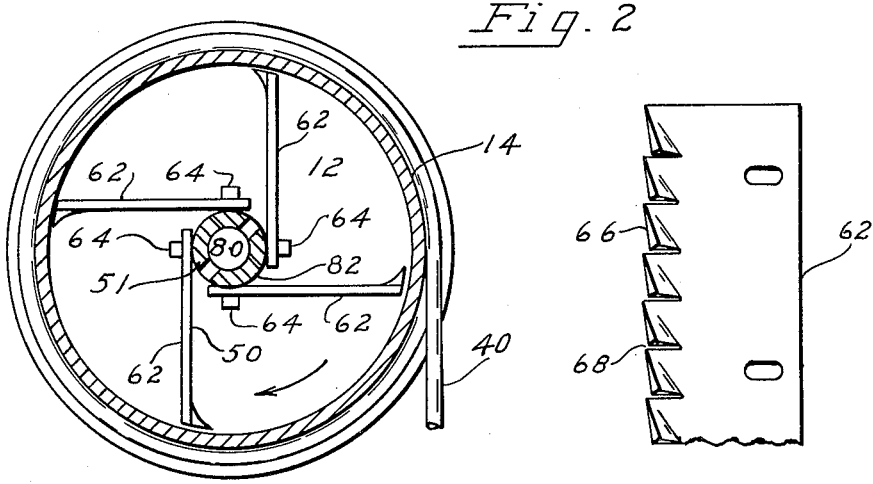
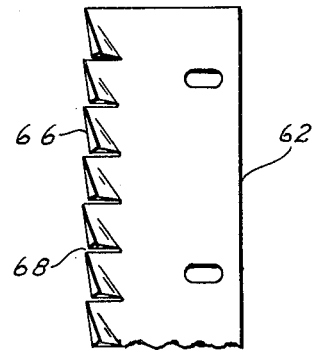
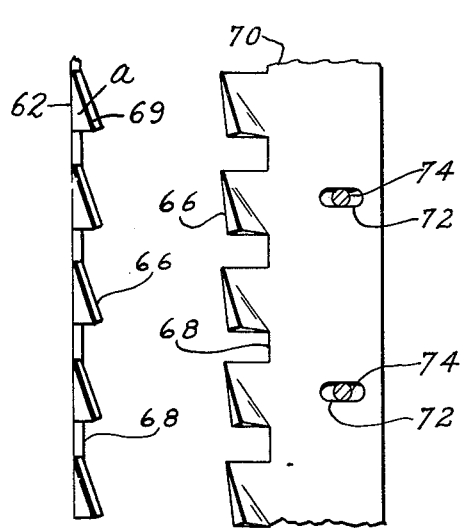
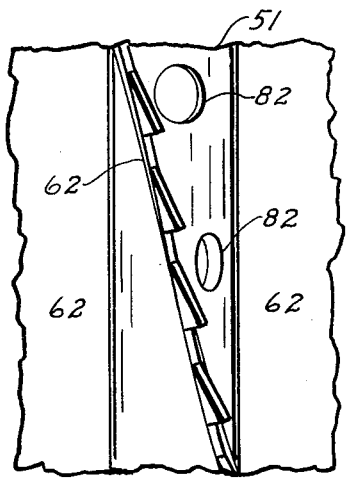

3,067,812
APPARATUS FOR DEVOLATIZING
VISCOUS FLUIDS
George A. Latinen, Wilbraham, and Robert H. M. Simon, Longmeadow, Mass., assignors to Monsanto Chemical Company, St. Louis, Mo., a corporation of Delaware
Filed Mar. 23, 1959, Ser. No. 801,284
3 Claims. (Cl. 159—6)

The present invention is directed to devolatilization of fluid materials and more particularly to continuous devolatilization of viscous fluid materials.

Synthetic polymeric materials, to be suitable for use in fabricating operations involving the use of heat, such as is had in curing, extruding and the like, should contain a minimum of volatiles, otherwise the fabricated products evidence poor structures, uneven porosity and other undesirable properties.

Reaction products from polymerization processes, particularly mass and solvent-type, as well as condensation-type polymerizations, contain in addition to polymer, large quantities of volatilizable materials such as residual monomeric components, organic solvents and the like. As a result these products are viscous fluid mixtures. Various methods have been contrived to separate the polymer from the remainder of these mixtures by extraction, fractionation and the like. One particular method which is often used is that of violently agitating the mixtures. The turbulence created by the agitation effects release of volatile components, which are then vented off from the mass. While this expedient has met with success in fluid mixtures of comparatively low viscosity, i.e., less than 100 poises at operating temperatures, it has been less than successful in devolatilizing or degasifying fluid mixtures of higher viscosities. Also, these methods have been particularly unsuccessful in their adaptation to continuous operation on fluids of high viscosity.

Accordingly, it is a principal object of the present invention to provide apparatus in which to continuously devolatilize viscous fluid media having viscosities greater than 100 poises at operating temperatures.

Other objects of the invention will in part be obvious and will in part appear hereinafter.

These and other objects of the invention are attained in an apparatus comprising, in combination, a heated casing essentially enclosing a devolatilization chamber, an exhaust head into which said chamber vents and a rotatable member located within said chamber. The rotatable member is provided with a plurality of radially projecting blades, each of said blades extending essentially over the length of said devolatilization chamber with the blades having serrated trailing edges at their radial extremities. The nip formed between the lands of the trailing edges of the blades and the interior of said chamber form an angle of 15-75° in the direction of retreat on rotation of said member. Rotation of said rotatable member is provided by attaching the same to a driving means. The apparatus, is also provided with an entry for charging process materials to the devolatilization chamber and an exit for discharging the finished product from said chamber and an exit for removing volatiles from said exhaust head.

For a fuller understanding of the nature and objects of the present invention, reference should be had to the following detailed description taken in connection with the accompanying drawings, in which:

FIG. 1 is a side view in section and with parts broken, representing one embodiment of the devolatilizing apparatus of the present invention, having an extruder head for discharging product.

FIG. 2 is a top view in section and with parts broken, taken along the line 2—2 of FIG. 1.

FIG. 3 is a fragmentary side view magnified and with parts broken illustrating blade edge detail of one embodiment of the present invention.

FIG. 4 is a fragmentary front view, magnified and with parts broken showing blade edge detail of another embodiment of the invention.

FIG. 5 is a fragmentary side view, magnified and with parts broken, corresponding to FIG. 4.

FIG. 6 is a fragmentary side view with parts broken of another embodiment of a rotatable member which can be used in the present invention.

Referring to the drawings wherein like numbers refer to like parts throughout, initially, FIG. 1 shows a devolatilizing apparatus 10 of rigid material construction. Devolatilizing chamber 12 and exhaust head 13 are defined within casing 14. Although casing 14 is shown having three separable parts, two defining chamber 12 and the third defining exhaust head 13, for convenience, the three parts of casing 14 will be considered as one. Divider 15 essentially separates the devolatilization chamber 12 from exhaust head 13. Flange 16, serves to securely locate closure 18 at the upper end of casing 14 with the result that exhaust head 13 is a substantially enclosed space. Closure 18 is shown attached to flange 16 through nutted-bolts 20 and 22 which project through complemenary slots, not legended, located in closure 18 and flange 16. Discharge of the devolatilized products is provided for by provision of extruder head 24 having an extrusion orifice 26. The extrusion head is shown integral to the bottom of casing 14.

In the embodiment shown, charging of the materials to be devolatilized into chamber 12 is had through conduit 30 which is tapped through casing 14 and into devolatilization chamber 12. Pump 32 facilitates charging of the process material into chamber 12. Exhaust head 13 is provided with conduit 34 tapped through casing 14 and an exhaust pump 36 integral of said conduit. Heat exchange coil 40 located externally of casing 14 serves to provide heat to at least the outer peripheries of devolatilization chamber 12 and exhaust head 13.

Rotatable member 50 is positioned along the longitudinal axis of chamber 12. Center shaft 51 of rotatable member 50 extends upwardly from chamber 12 and through exhaust head 13 to project through gasket 52, the latter positioned by means of collar 54 in closure 18. Shaft 51 is then connected at its upper end with variable speed gear box 56 which is in turn driven by motor 58. In this manner, variable speed rotation can be imparted to rotatable member 50. At the opposite end which is located at the discharge end of chamber 12, rotatable member 50 is provided with, in one preferred embodiment, an extruder screw which is effected by providing a projection of shaft 51 with a helical rib 60 and a conical tip. The use of an extruder head at the discharge end of devolatilizer 10 has the advantage of contributing to the radial or rotational stabilization of rotatable member 50. In this latter regard, further rotational stability is contributed to member 50 by the provision of O-ring-type gasket 61 in divider 15.

A plurality of blades 62—62 radially project from rotatable member 50. This is shown particularly well in FIG. 2. Blades 62—62 have blade edges, the wiping edges at the radial extremities thereof, have close clearance with the periphery of chamber 12, when rotatable member 50 is rotated in a clockwise direction. The radial extension of blades 62—62 can be somewhat offset from the longitudinal axis of casing 12 in the manner shown in FIG. 2 in which blades 62—62 are radially extended tangentially of shaft 51 while being attached to the said shaft by screws 64—64. Additionally, the radial projection of blades 62—62, while preferably linear in nature, can have a curvilinear projection. The axial extension of blades 62—62 is preferably as great as chamber 12 will allow without interference with the rotation of rotatable member 50.

The radial extremities of blades 62—62 are serrated, or notched in nature, to form lands 66—66 and grooves 68—68. The lands or teeth 66—66 are bent at their lowermost corner portion in the direction of retreat on rotation of rotatable member 50 defining a projected angle "a" of 15–75°, and more preferably 30–60° as shown in FIG. 4 between the extreme radial edge 69 of the bent portion of the land 66 and the extended planar surface of the blade 62. Referring again to FIG. 1, the lands are situated in staggered relationship considered axially with respect to the several blades 62—62. Together, these expedients effect wiping of process material onto the periphery of chamber 12 in the form of a film having annular furrows followed by repositioning of the same by the next following blade.

FIGS. 3–5 show in greater detail one embodiment of the invention relative to the blade edges of the radial extremities of blades 62—62. The lands 66—66 of the blade edges 62—62 are shown angling downward (toward the discharge end of apparatus 10) and in the direction of rotational retreat. In FIG. 6 the blades 62—62 are helically stationed on shaft 51. Both of these expedients facilitate advance of the material toward the discharge end (extruder 24) and are particularly useful if devolatization apparatus 10 is positioned in such a manner that the longitudinal axis of casing 14 is in horizontal alignment.

In FIGS. 1 and 2 blades 62—62 are shown having a unitary and fixed radial projection while FIGS. 3, 5 and 6 by comparison depict an embodiment in which the blade edges and consequently the wiping edges of blades 62—62 are radially adjustable through use of a type of doctor-blade 70. These are adjustably attached to the blade-proper of blades 62—62 through set screws 72—72 projected through radially extending slots 74—74 located in said doctor-blades. The tolerance between the wiping edges, and more particularly lands 66—66 of blades 62—62 and the periphery of chamber 12 should be close, about 1/32 inch performs well, in order to prevent process material from eventuating as stagnated wall film. Variation in tolerance can be exercised depending on the physical properties of the material being processed. The number of grooves 68—68 per unit axial length of blade 62 can vary. The deeper and more closely spaced these are, the greater the surface area of the process material wiped onto the inner surface of casing 14 (in the devolatilization chamber 12) and consequently the more complete devolatilization which can take place. However, the grooves should not be so deep that the process material will enter in substantial amounts and accumulate in the interior sections formed by the junctions of blades 62—62 and shaft 51. A depth of ¼ to ⅓ of the radius of chamber 12 approaches the limit. Additionally, the width of the individual grooves 68—68 should be sufficiently wide to allow a given furrow formed by a given groove 68 of an individual blade to retain identity as a furrow until contacted by the land 66 on the blade 62 following the blade 62 which formed the furrow. An individual groove width of about 1/30 of the radius works well.

As indicated with particularity in FIG. 2, the number of blades 62—62 are preferably four. Some variation in this number can be had. However, since devolatilization capacity increases only as the square root of the number of blades, increasing the number of blades complicates construction and reduces available vapor space with deleterious effects sufficient to offset benefits obtained in increasing the number of blades.

To advance the material being processed under desired laminar flow conditions, the rotatable member 50 and more particularly the blade edges of blades 62—62 are rotated at a peripheral speed of 25–250 feet per minute. The peripheral speed is independent of the size of the chamber 12. The recommended ratio of length v. diameter of chamber 12, ranges between 2:1 to 10:1. Further variation within this range can be observed in relation to a given process material. Additionally, the speed of advance of the process material can be observed in relation to the $L/D$ ratio of chamber 12 and this in turn can be used to regulate the rate of feed of charging pump 32.

In addition to the peripheral speed at which rotatable member 50 is rotated, the amount of material present in chamber 12 will reflect on the efficiency of apparatus 10. Optimum conditions can be had using between 10% to 30% fillage. While fillage can be greater or less than these amounts, best mixing action with adequate vapor space and film surface area of the process material being wiped onto the interior surface of casing 14 lies within these limits.

Heating coil 40 is provided to cause heating of at least the outer periphery of chamber 12. The temperature of the casing 14 and consequently the periphery of 12 can be varied as depending upon the material being processed. Other heating means such as jacketing and the like can also be used.

Referring back to FIGS. 1 and 2, a preferred embodiment with which to exhaust or vent the volatiles liberated from the process materials in devolatilization chamber 12 into exhaust head 13, is shown taking the form of a vented hollow core 80 provided in shaft 51. The axial location of core 80 is such that vents or orifices 82—82 communicating with core 80 are axially located within devolatilization chamber 12, while exit into exhaust head 13 of core 80 is provided through vents or orifices 84—84 axially located within said head. This can also be accommodated by providing divider 15 with vents, not shown, or by elimination of gasket 61 from divider 15. As indicated earlier, residence of the volatiles within exhaust head 13 is kept at a minimum by provision of conduit 34 and operation of exhaust pump 36.

The devolatilization apparatus 10 of the present invention can be used to devolatilize or degasify various process materials which are continuously charged into the devolatilization chamber 12. Operation of charging pump 32 together with exhaust pump 36, rotation of rotatable member 50 and the circulation of heat-exchange liquid within coil 50 in the manner previously described will effect devolatilization of the material so charged.

The devolatilizer of the present invention has particular utility in the devolatilization of viscous fluids having 100 to 100,000 poise viscosity measured at the operating temperatures. Various polymerized materials, more particularly the reaction products or media resulting from polymerization reactions are within this viscosity range. These include polystyrene, polyethylene and various other polyolefins resulting from mass, emulsion and suspension polymerizations, polymers resulting from condensation reactions such as nylon, phenol-formaldehyde, melamine-formaldehyde, urea-formaldehyde, polycarbonates, etc. It can also be used to good advantage in devolatilizing other organic and inorganic materials which are viscous in nature and from which it is desirable to extract various gases, solvents and the like.

It will thus be seen that the objects set forth above among those made apparent from the preceding description are efficiently attained and since certain changes may be made in carrying out the above apparatus without departing from the scope of the invention, it is intended that all material contained in the above description shall be interpreted as illustrative and not in a limiting sense.

What is claimed is:

1. A devolatilizing apparatus adapted to devolatilizing viscous fluid mixtures comprising a vertically aligned externally heated casing essentially enclosing a devolatilization chamber and an upper exhaust head; said devolatilization chamber separated from said exhaust head by a horizontally aligned divider, a rotatable member located within said casing comprising a center shaft positioned along the longitudinal axis of said casing and having a hollow core, said hollow core venting into the devolatilization chamber and the exhaust head, a plurality of blades radially projecting from said center shaft, each of said blades axially extending essentially over the length of said devolatilization chamber and being provided with serrated teeth at the radial extremities thereof, the said serrated teeth being bent at their lowermost corner portion in the direction of retreat on rotation of said member to form a projected angle of 15–75° between the extreme radial edge of said bent portion and the extended planar surface of the blade, an extruder head being integrated at the lower end of said devolatilization chamber with the extruder screw thereof being formed from an axial projection of said center shaft and provided with a helical rib and a conical tip, the center shaft of said rotatable member being connected at the upper end thereof to a driving means for imparting rotation to the said member; said chamber being provided with an entry for charging process materials thereinto and an extrusion orifice at the lower end for exit of devolatilized product, and said exhaust head being provided with an exit for removing volatiles therefrom.

2. The devolatilizing apparatus of claim 1 wherein the projected angle formed by the extreme radial edge of said bent corner portion is on the order of 30–60°.

3. The devolatilizing apparatus according to claim 1 wherein the serrated teeth of said blades are in staggered relationship when considered with regard to the several blades.

References Cited in the file of this patent

UNITED STATES PATENTS

| | | |
|---|---|---|
| 263,172 | Gubbins | Aug. 22, 1882 |
| 1,466,579 | Collver | Aug. 28, 1923 |
| 2,011,055 | Klugh | Aug. 13, 1935 |
| 2,349,254 | English et al. | May 23, 1944 |
| 2,546,381 | Zahm | Mar. 27, 1951 |
| 2,779,724 | Dunning et al. | Jan. 29, 1957 |
| 2,857,144 | Gurley et al. | Oct. 21, 1958 |

FOREIGN PATENTS

| | | |
|---|---|---|
| 1,123,231 | France | Sept. 19, 1956 |